(12) United States Patent
Huston et al.

(10) Patent No.: US 12,526,350 B2
(45) Date of Patent: Jan. 13, 2026

(54) SYSTEMS AND METHODS OF PROTOCOL ADJUSTMENT IN MEDICAL IMAGING

(71) Applicant: GE PRECISION HEALTHCARE LLC, Wauwatosa, WI (US)

(72) Inventors: Jeremy Huston, Brookfield, WI (US); Andrew J. Byshenk, Wauwatosa, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 535 days.

(21) Appl. No.: 17/988,853

(22) Filed: Nov. 17, 2022

(65) Prior Publication Data

US 2024/0171660 A1  May 23, 2024

(51) Int. Cl.
  *H04L 69/18*   (2022.01)
  *G06T 11/00*   (2006.01)
  *H04L 67/125*  (2022.01)

(52) U.S. Cl.
  CPC ............ *H04L 69/18* (2013.01); *G06T 11/005* (2013.01); *H04L 67/125* (2013.01); *G06T 2210/41* (2013.01); *G06T 2211/408* (2013.01)

(58) Field of Classification Search
  CPC ..... H04L 69/18; H04L 67/125; G06T 11/005; G06T 2210/41; G06T 2211/408; G01R 33/481; G01R 33/4215; G01R 33/4818
  See application file for complete search history.

(56) References Cited

U.S. PATENT DOCUMENTS

| | | | |
|---|---|---|---|
| 8,705,819 B2 | 4/2014 | Carlsen | |
| 9,636,077 B2 | 5/2017 | Braun | |
| 9,715,575 B2 | 7/2017 | Cohen-Solal | |
| 9,934,357 B2 | 4/2018 | Grodzki | |
| 2003/0011369 A1* | 1/2003 | Brittain | G01R 33/28 324/309 |
| 2005/0206967 A1* | 9/2005 | Viswanth | G16H 30/20 358/448 |
| 2005/0267348 A1 | 12/2005 | Wollenweber | |
| 2010/0135543 A1 | 6/2010 | Weese | |
| 2011/0153255 A1 | 6/2011 | Horger | |
| 2016/0354047 A1* | 12/2016 | Huston | A61B 6/5288 |

* cited by examiner

*Primary Examiner* — Joel Lamprecht
*Assistant Examiner* — Amy Shafqat
(74) *Attorney, Agent, or Firm* — Armstrong Teasdale LLP

(57) ABSTRACT

A positron emission tomography-magnetic resonance (PET-MR) system is provided. The PET-MR system includes an MR subsystem, a PET subsystem, and a protocol adjustment system. The protocol adjustment system includes a protocol adjustment computing device having at least one processor programmed to receive a protocol. The protocol includes a scanning task list including a PET scanning task of a bed and MR scanning tasks of the bed and to be performed simultaneously with the PET scanning task. The protocol also includes a combination list indicating MR data acquired by an MR scanning task of one bed are to be combined with MR data acquired by the same MR scanning task of another bed. The at least one processor is further programmed to adjust the protocol based on the combination list by processing the one or more MR scanning tasks based on the combination list.

20 Claims, 13 Drawing Sheets

SYSTEMS AND METHODS OF PROTOCOL ADJUSTMENT IN MEDICAL IMAGING

BACKGROUND

The field of the disclosure relates generally to systems and methods of protocol adjustment, and more particularly, to systems and methods of protocol adjustment in medical imaging systems.

Magnetic resonance imaging (MRI) has proven useful in diagnosis of many diseases. MRI provides detailed images of soft tissues, abnormal tissues such as tumors, and other structures, which cannot be readily imaged by other imaging modalities, such as computed tomography (CT). Position emission tomography (PET) is suitable to study metabolism of a person, compared to MRI, and is often used in oncology examinations.

A combined system of a PET-MR system includes a PET subsystem and an MR subsystem. PET and MR scanning is performed at multiple beds in a PET-MR system. A protocol is used to prescribe the scan, which includes sequences and parameters designed to assess a particular region, pathological process, or disease. A protocol needs to be adjusted to be suitable for individual subjects. Known methods are disadvantaged in some aspects and improvements are desired.

BRIEF DESCRIPTION

In one aspect, a positron emission tomography-magnetic resonance (PET-MR) system is provided. The PET-MR system includes an MR subsystem configured to acquire MR signals from a subject, a PET subsystem configured to acquire PET emissions of the subject, and a protocol adjustment system in communication with the MR subsystem and the PET subsystem. The PET subsystem is integrated with the MR subsystem. The protocol adjustment system includes a protocol adjustment computing device, the protocol adjustment computing device including at least one processor electrically coupled with at least one memory device. The at least one processor is programmed to receive a protocol. The protocol includes a scanning task list associated with one or more beds and including a PET scanning task of a bed of the one or more beds and one or more MR scanning tasks of the bed and to be performed simultaneously with the PET scanning task. The protocol also includes a combination list indicating MR data acquired by an MR scanning task of one bed are to be combined with MR data acquired by the same MR scanning task of another bed. The at least one processor is further programmed to adjust the protocol based on the combination list by processing the one or more MR scanning tasks based on the combination list, and to output the adjusted protocol.

In another aspect, a protocol adjustment system is provided. The protocol adjustment system includes a protocol adjustment computing device, the protocol adjustment computing device including at least one processor electrically coupled with at least one memory device. The at least one processor is programmed to receive a protocol, wherein the protocol includes a scanning task list associated with one or more beds and including a PET scanning task of a bed of the one or more beds and one or more MR scanning tasks of the bed to be performed simultaneously with the PET scanning task. The protocol also includes a combination list indicating MR data acquired by an MR scanning task of one bed are to be combined with MR data acquired the same MR scanning task of another bed. The at least one processor is also programmed to adjust the protocol based on the combination list by processing the one or more MR scanning tasks based on the combination list, and to output the adjusted protocol.

In one more aspect, a protocol adjustment system of an MR system is provided. The protocol adjustment system includes a protocol adjustment computing device, the protocol adjustment computing device including at least one processor electrically coupled with at least one memory device. The at least one processor is programmed to receive a protocol, wherein the protocol includes a scanning task list associated with one or more beds and including one or more MR scanning tasks of a bed of the one or more beds. The protocol also includes a combination list indicating MR data acquired by an MR scanning task of one bed are to be combined with MR data acquired by the same MR scanning task of another bed. The at least one processor is further programmed to adjust the received protocol based on the combination list by processing the one or more MR scanning tasks based on the combination list, and to output the adjusted protocol.

DRAWINGS

DETAILED DESCRIPTION

Figure 1:
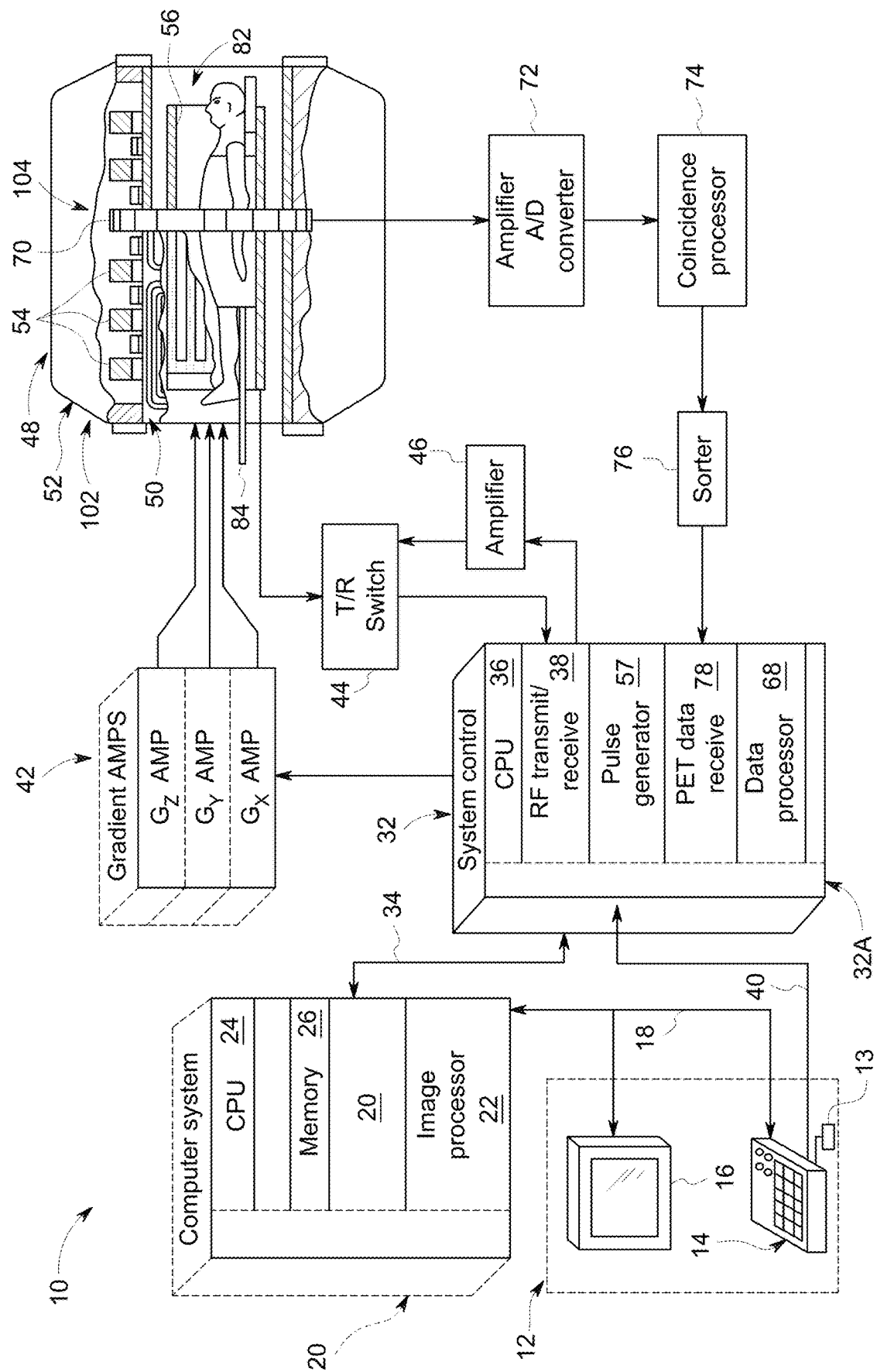
FIG. 1 is a schematic diagram of an example positron emission tomography-magnetic resonance (PET-MR) system.

The disclosure includes systems and methods of protocol adjustment in medical imaging systems. Position emission tomography-magnetic resonance (PET-MR) system is used herein as an example for illustration purposes only. Systems and methods described herein may be applied in other imaging modalities, such as MR systems. As used herein, a subject is a human, an animal, or a phantom. Method aspects will be in part apparent and in part explicitly discussed in the following description.

A PET-MR system includes a PET subsystem and an MR subsystem. The scanning of the two subsystems are performed simultaneously, where the subsystems acquire data of the same bed position at the same time. A PET detector typically has a range of 25 centimeter (cm) in the superior-inferior direction, while an MR scanner has a range of 40 cm-50 cm. PET scanning therefore is typically performed in multiple beds. As used herein, a bed refers to the cradle position of the system, where a cradle is used to move a subject in and out of the system. Imaging protocols or protocols are used to prescribe an imaging examination. A protocol of a PET-MR system includes one or more beds, with each bed including a PET scanning task and one or more MR scanning tasks. The MR scanning task(s) associated with one bed may be different from MR scanning tasks(s) associated with another bed, for targeting anatomies and processes at different parts of the subject.

A PET-MR system is often used in oncology examinations to conduct a whole-body survey, where the PET subsystem is used to detect metabolism changes and tumors of the entire body, while the MR subsystem provides detailed images of the anatomies. Accordingly, a PET-MR examination is often applied to an entire subject or a relatively large range of the subject. Because of the limited range of a PET detector, multiple beds are needed in a PET-MR imaging protocol.

Protocols for different applications or processes are often created and provided to users. The protocols are designed with a person of an average height in mind. Subjects' heights may vary greatly, for example, from a child to a relatively tall adult. A protocol designed for a person of an average height may include five beds, while a relatively tall adult may need six beds and a child may only need four beds to cover the same desired scanning range and/or anatomies. The number of beds may be adjusted. The MR scanning tasks, however, must be manually adjusted in known systems. Since the onset of PET-MR imaging over ten years ago, conventionally, to accommodate a protocol to an individual subject, the protocols must be manually adjusted, where each protocol in the examination and all beds and scanning tasks in each protocol are manually adjusted to accommodate the subject, which is labor intensive and error-prone. If errors occur, the image series may miss the desired anatomy and rescan may be needed, reducing the operational efficiency and increasing costs at a site. If multiple protocols from a master protocol are created in an attempt to accommodate heights of groups of subjects at a site, any changes to the master protocol must be manually made to all protocols, which is also labor intensive and more importantly error-prone. Therefore, there is a long-felt need in medical imaging to simplify protocol adjustment and reduce errors occurred during protocol prescription.

Systems and methods described herein automatically adjust protocols using a combination list. A known combination list is used in post-processing of multi-station MR data, where MR data are acquired in an MR system at multiple cradle positions. Multi-station MR scanning is not used often because the relatively long superior-inferior length of an MR scanner is typically sufficient to cover the desired anatomy, and a whole-body survey is typically not performed with an MR system due to MR scanning being anatomy or organ specific. The known combination list is used to combine series of MR data from MR scanning tasks in different stations into one combined series for downstream processes and image display such that a radiologist may view the images of the interested anatomies in one series for increased viewing convenience. Because the combination list is used for post-processing of multi-station MR data, a person skilled in the art would not have been motivated to use the combination list in a protocol adjustment at the front-end of or even before a scanning in a different modality of PET-MR imaging, thereby rendering the problem of automatic protocol adjustment in PET-MR unsolved since the onset of PET-MR system over a decade ago.

The systems and methods described herein meet the long-felt need of protocol adjustment in medical imaging, thereby streamlining a time-consuming and error-prone process. The systems and methods described herein also increase the viewing convenience of the users, where MR images for the same MR scanning tasks from different beds are processed and displayed as one series.

Referring to FIG. 1, a schematic diagram of an example PET-MR system 10 is shown. System 10 includes an MR subsystem 102 configured to acquire MR signals from a subject and a PET subsystem 104 configured to acquire PET emissions of the subject. MR subsystem 102 and PET subsystem 104 are integrated with one another. The operation of the system may be controlled from an operator console 12 which includes a keyboard or other input device 13, a control panel 14, and a display 16. Console 12 communicates through a link 18 with a separate computer system 20 that enables an operator to control the production and display of images on display 16. Computer system 20 includes a number of modules, such as an image processor 22, a CPU 24, and a memory 26. Computer system 20 may also be connected to permanent or back-up memory storage or a network, or may communicate with a separate system control 32 through a link 34. Input device 13 may include a mouse, keyboard, track ball, touch activated screen, light wand, or any similar or equivalent input device, and may be used for interactive geometry prescription.

System control 32 includes a set of modules in communication with one another and connected to operator console 12 through link 40. Through link 34, system control 32 receives commands indicating scan sequences that are to be performed. For MR data acquisition, an RF transmit/receive module 38 commands scanner 48 to carry out the desired scan sequence, by sending instructions, commands, and/or requests describing the timing, strength, and shape of the RF pulses and pulse sequences, and the timing and length of the data acquisition window. In this regard, a transmit/receive switch 44 and amplifier 46 control the flow of data to scanner 48 from RF transmit module 38 and from scanner 48 to RF receive module 38. System control 32 also connects to a set of gradient amplifiers 42 having Gx, Gy, and Gz amplifiers, to indicate the timing and shape of the gradient pulses that are produced during the scan.

The gradient waveform instructions produced by system control 32 are sent to gradient amplifier 42. Amplifiers 42 may be external of scanner 48 or system control 32, or may be integrated therein. Each gradient amplifier excites a corresponding physical gradient coil in a gradient coil assembly 50 generally designated to produce the magnetic field gradients used for spatially encoding acquired signals. Gradient coil assembly 50 forms part of a magnet assembly 52 which includes a polarizing magnet 54 and an RF coil 56 (or a whole-body RF coil). Alternatively, the gradient coils of gradient coil assembly 50 may be independent of magnet assembly 52. Coils 56 of the RF coil may be configured for both transmitting and receiving, or for transmit-only or receive-only. A pulse generator 57 may be integrated into system control 32 as shown, or may be integrated into scanner 48, to produce pulse sequences or pulse sequence signals for gradient amplifiers 42 and/or RF coil 56. In addition, pulse generator 57 may generate PET data blanking signals synchronously with the production of the pulse sequences. The blanking signals may be generated on separate logic lines for subsequent data processing. The MR signals resulting from the excitation pulses and emitted by the excited nuclei in the subject may be detected by whole body coil 56 or by separate receive coils and are then transmitted to the RF transmit/receive module 38 via T/R switch 44. The MR signals are demodulated, filtered, and digitized in data processor 68 of system control 32.

An MR scan is complete when one or more sets of raw k-space data has been acquired in data processor 68. The raw k-space data is reconstructed in data processor 68, which operates to transform the data (through Fourier or other techniques) into images. The images are conveyed through link 34 to computer system 20 to be stored in memory 26. Alternatively, in some systems, computer system 20 may assume the image data reconstruction and other functions of data processor 68. In response to commands received from operator console 12, image data stored in memory 26 may be archived in long term storage or may be further processed by image processor 22 or CPU 24, conveyed to operator console 12, and presented on display 16.

In combined MR-PET scanning systems, PET data may be acquired simultaneously with the MR data acquisition. Thus, scanner 48 also contains a positron emission detector array or ring 70, configured to detect gamma rays from positron annihilation radiations emitted from a subject. Detector array 70 includes a plurality of scintillators and photovoltaics arranged about a gantry. Detector array 70 may, however, be of any suitable construction for acquiring PET data. In addition, the scintillator packs, photovoltaics, and other electronics of detector array 70 are shielded from the magnetic fields and/or RF fields by way of an RF shield (not shown).

Gamma ray incidences detected by detector array 70 are transformed, by photovoltaics of detector array 70, into electrical signals and are conditioned by a series of front-end electronics 72. Front-end electronics 72 may include various amplifiers, filters, and analog-to-digital converters. The digital signals output by front-end electronics 72 are then processed by a coincidence processor 74 to match gamma ray detections as potential coincidence events. When two gamma rays strike detectors approximately opposite one another, it is possible, absent the interactions of random noise and signal gamma ray detections, that a positron annihilation took place somewhere along the line between the detectors. Thus, the coincidences determined by coincidence processor 74 are sorted into true coincidence events and are ultimately integrated by data sorter 76. The coincidence event data, or PET data, from sorter 76 is received by system control 32 at a PET data receive port 78 and stored in memory 26 for subsequent processing. PET images may then be reconstructed by an image processor 22 and may be combined with MR images to produce hybrid structural and metabolic or functional images. Front-end electronics 72, coincidence processor 74 and sorter 76 may each be external of scanner 48 or system control 32, or may be integrated therein.

Figure 2A:
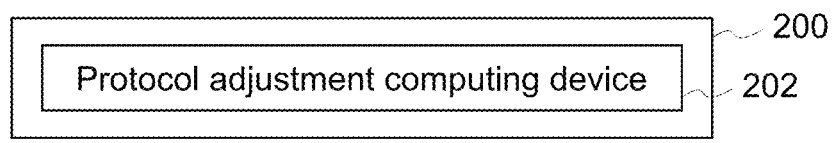
FIG. 2A is a schematic diagram of an example protocol adjustment system.

FIG. 2A is a schematic diagram of an example protocol adjustment system 200. In the example embodiment, protocol adjustment system 200 includes a protocol adjustment computing device 202 configured to automatically adjust imaging protocols. Protocol adjustment computing device 202 may be included in computer system 20 of PET-MR system 10, or may be included in a separate computing device that is in communication with computer system 20, through wired or wireless communication. In one example, protocol adjustment computing device 202 is a server computing device, and may be cloud-based. In some embodiments, protocol adjustment computing device 202 is a separate computing device from computer system 20 and receives data acquired by computer system 20 through a portable storage device, such as a flash drive or a thumb drive.

Figure 2B:
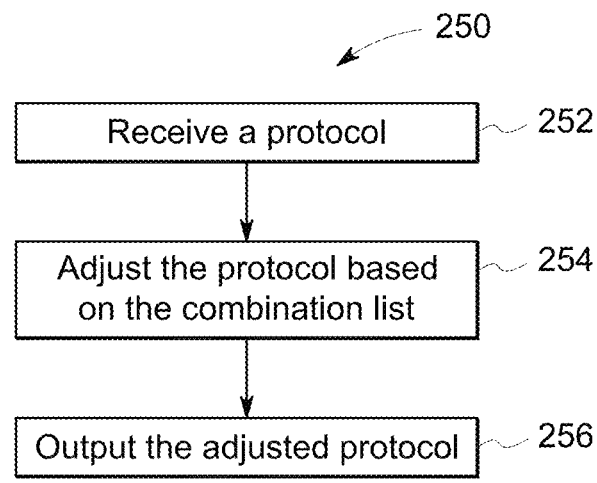
FIG. 2B is a flow chart of an example method of protocol adjustment.
Figure 4A:
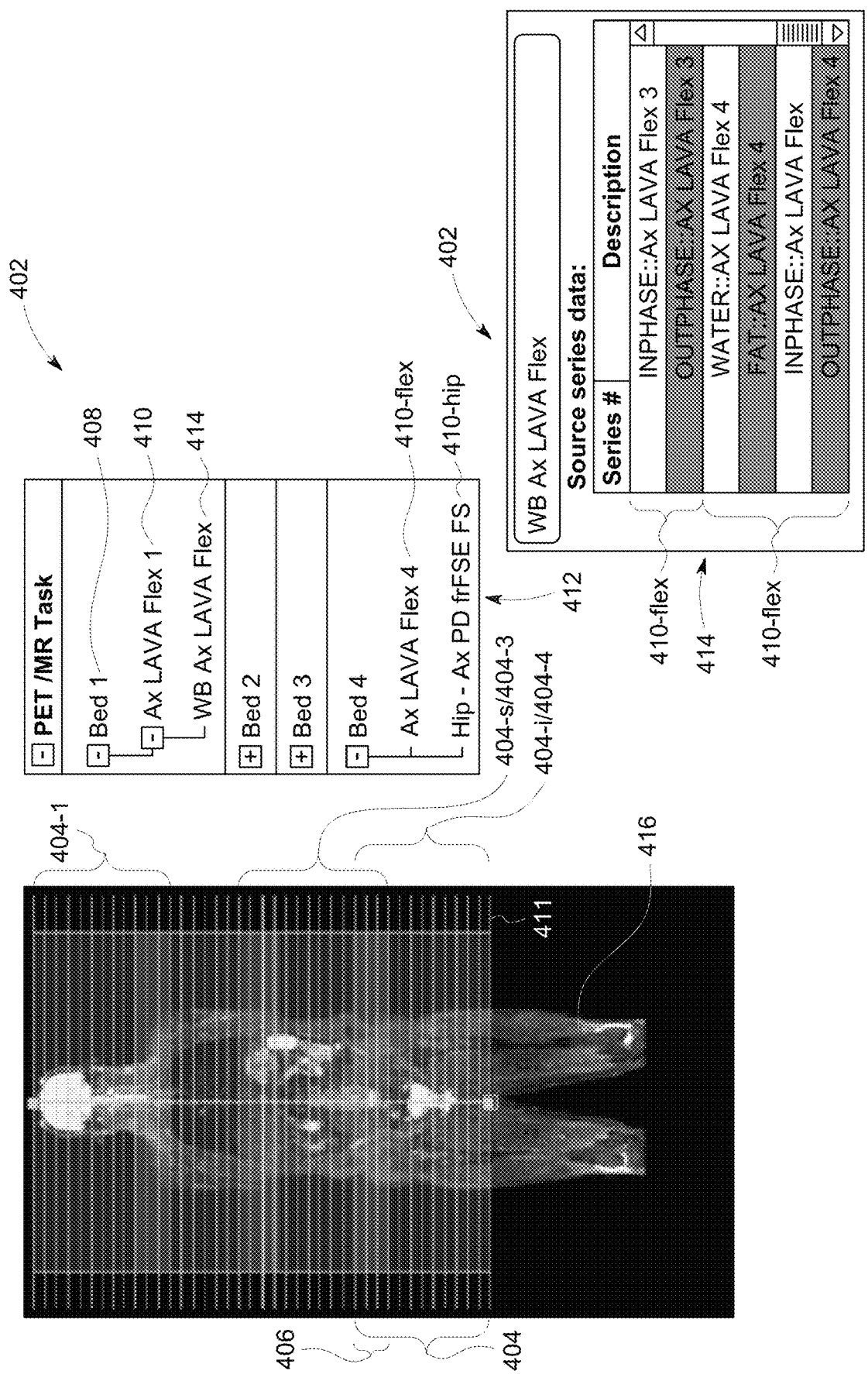
FIG. 4A shows an example protocol before adding a bed.

FIG. 2B is a flow chart of an example method 250 of protocol adjustment. Method 250 may be implemented using protocol adjustment computing device 202. In the example embodiment, method 250 includes receiving 252 a protocol associated with one or more beds. In PET-MR, a subject is placed in a bore 82 of system 10. Because detector array 70 has a range in the superior-inferior direction, e.g., 25 cm, shorter than a subject's height, to scan a whole body or a region greater than the scanner range with detector array 70, more than one bed is used. As used herein, a bed is a scanning range at a certain position of a cradle 84 (see FIG. 1). For example, as shown in FIG. 4A (described further later), a protocol 402 includes four beds 404. Each bed 404 has a range of 25 cm. Neighboring beds 404 may have an overlapped region 406, which is scanned at positions of neighboring beds 404-$s$ and bed 404-$i$. Beds 404 are arranged in superior-inferior order, where the most superior bed 404 may start at 1.

In PET-MR system, MR data are also acquired at a given bed position. In some beds 404, PET scanning and MR scanning are performed simultaneously. For example, for Bed 1, a PET scanning task 408 is performed simultaneously with MR scanning tasks 410. MR scanning tasks 410 may be performed in slices 411 or a 3D slab (not shown). For different beds 404, some MR scanning tasks 410 in the beds may be the same while other MR scanning tasks 410 may be different. For example, beds 404-1 and 404-4 both include MR scanning task 410-flex, while bed 404-4 includes an MR scanning task 410-hip, which is not included in bed 404-1. PET scanning tasks 408 and MR scanning tasks 410 are included in a scanning task list 412.

Protocol 402 further includes a combination list 414 indicating MR data acquired by an MR scanning task 410 in one bed 404 are to be combined with the same MR scanning task 410 in another bed 404 during post-processing such that data associated with the MR scanning task 410 acquired from multiple beds are provided as one single image series or data set. The process in post-processing of combining data acquired by an MR scanning task at multiple beds may be referred to as a combine process. A combination list 414 may be a list of MR scanning tasks 410, data of which are to be combined to form a combined series in a combine process. For example, as shown in FIG. 4A, combination list 414 indicates data acquired with MR scanning task 410-flex from beds 404-3 and 404-4 are to be combined later in post-processing after data acquisition. Alternatively, combination list 414 may be a list of MR scanning tasks 410 with corresponding flags indicating whether the data acquired by MR scanning tasks 410 are to be combined. Combination list 414 may be shown in scanning task list 412, thereby increasing the convenience to access and visualize combination list 414. Combination list 414 may be specific to a MR scanning task 410. For example, combination list 414 shown in FIG. 4A is specific to MR scanning task 410-flex.

Referring back to FIG. 2B, in the example embodiment, method 250 further includes adjusting 254 the received protocol by processing scanning tasks based on combination list 414. For example, a bed may be added or deleted and an MR scanning task 410 in the bed may be included or excluded based on combination list 414. A localizer image 416 of the subject may be received during adjusting 254 the protocol (see FIG. 4A). A localizer image 416 may be acquired by MR subsystem 102 that covers the whole body or the desired scanning range of the subject such as from the head to the knee. Based on the localizer image, whether a number of beds should be changed may be determined. Protocol 402 may be designed with a subject of a typical height in mind. For example, protocol 402 may be designed with the number of beds as 4 to scan an imaging range that covers from the head to the knee of the person of an average height. When a subject taller or shorter than the average height is to be scanned, the number of beds may need to be increased or decreased to cover the same range from the head to the knee of the subject. Whether to change the number of beds may be determined by placing scanning ranges of protocol 402 over localizer image 416, showing the number of beds may be increased or decreased to cover the desired imaging range of protocol 402. For example, as shown in FIG. 4A, protocol 402 is designed to cover from the head to the knee of a subject of an average height. When the scanning range of protocol 402 is placed over localizer image 416, instead of from the head to the knee, the current number of beds of four covers from the head to the hip of the subject. As a result, a new bed should be added. The determination may be performed by a technologist or a user operating PET-MR system 10. Alternatively, protocol adjustment computing device 202 is configured to determine whether to change the number of beds based on the height of the subject by comparing the desired scanning range of anatomies based on localizer image 416 and the range in protocol 402.

In the example embodiment, in adjusting 254 a protocol, MR scanning tasks associated with an added bed may not be entirely copied from the last inferior bed, and MR scanning tasks associated with a removed bed may not be entirely removed with the removal of the bed because MR scanning tasks in a bed may or may not need to be included in the added bed or deleted from the removed bed. To add a bed, MR scanning tasks 410 may be included in the new bed or excluded from the new bed, based on combination list 414. To delete a bed, MR scanning tasks 410 in the deleted bed may be kept or deleted based on combination list 414.

In the example embodiment, method 250 includes outputting 256 the adjusted protocol. The adjusted protocol fits the scanning needs for the specific subject.

Figure 3:
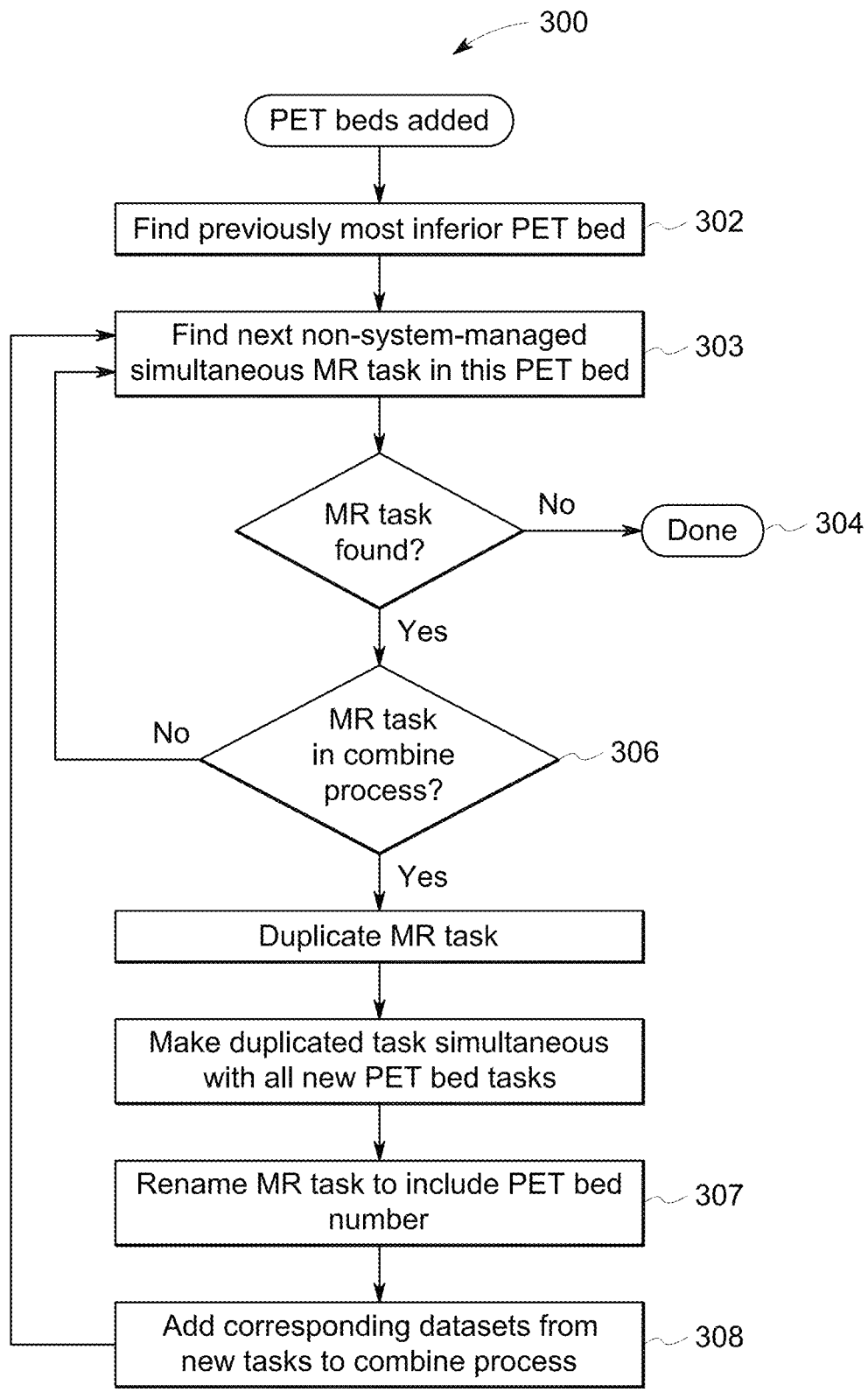
FIG. 3 is a flow chart of an example method of adding a bed in a PET-MR system.

FIG. 3 is a flow chart of an example method of adding 300 a bed. Method 300 includes identifying 302 previously most inferior bed among the current beds. Method 300 further includes identifying 303 a simultaneous MR scanning task in the previously most inferior bed. A simultaneous MR scanning task is an MR scanning task performed simultaneously with PET scanning of the bed. If a simultaneous MR scanning task is not found associated with the bed, the process is completed 304. If an MR scanning task is found in the bed, whether the MR scanning task is in a combine process is determined 306. In a combine process, data acquired by the MR scanning task in one bed will be combined with data of the same MR scanning task but in a different bed in post-processing. If the MR scanning task is not in a combine process, the MR scanning task is not copied in the new bed and protocol adjustment system 200 goes back to identifying 303 a simultaneous MR scanning task to identify the next MR scanning task in the previously most inferior bed. If the MR scanning task is in a combine process, the MR scanning task is duplicated in the new bed. The MR scanning task is also set as being simultaneous with the PET scanning task of the new bed, where the PET scanning task at the new bed position is performed simultaneously with the duplicated MR scanning task. The duplicated MR scanning task may be renamed 307 to include the new bed number to distinguish from the same MR scanning task in different bed(s). The new MR scanning task is also added 308 to the combination list. After the MR scanning task is processed, protocol adjustment system 200 goes back to identifying 303 a simultaneous MR scanning task. Adding 300 a bed is completed when all simultaneous MR scanning tasks in the previously most inferior bed have been processed.

Figure 4B:
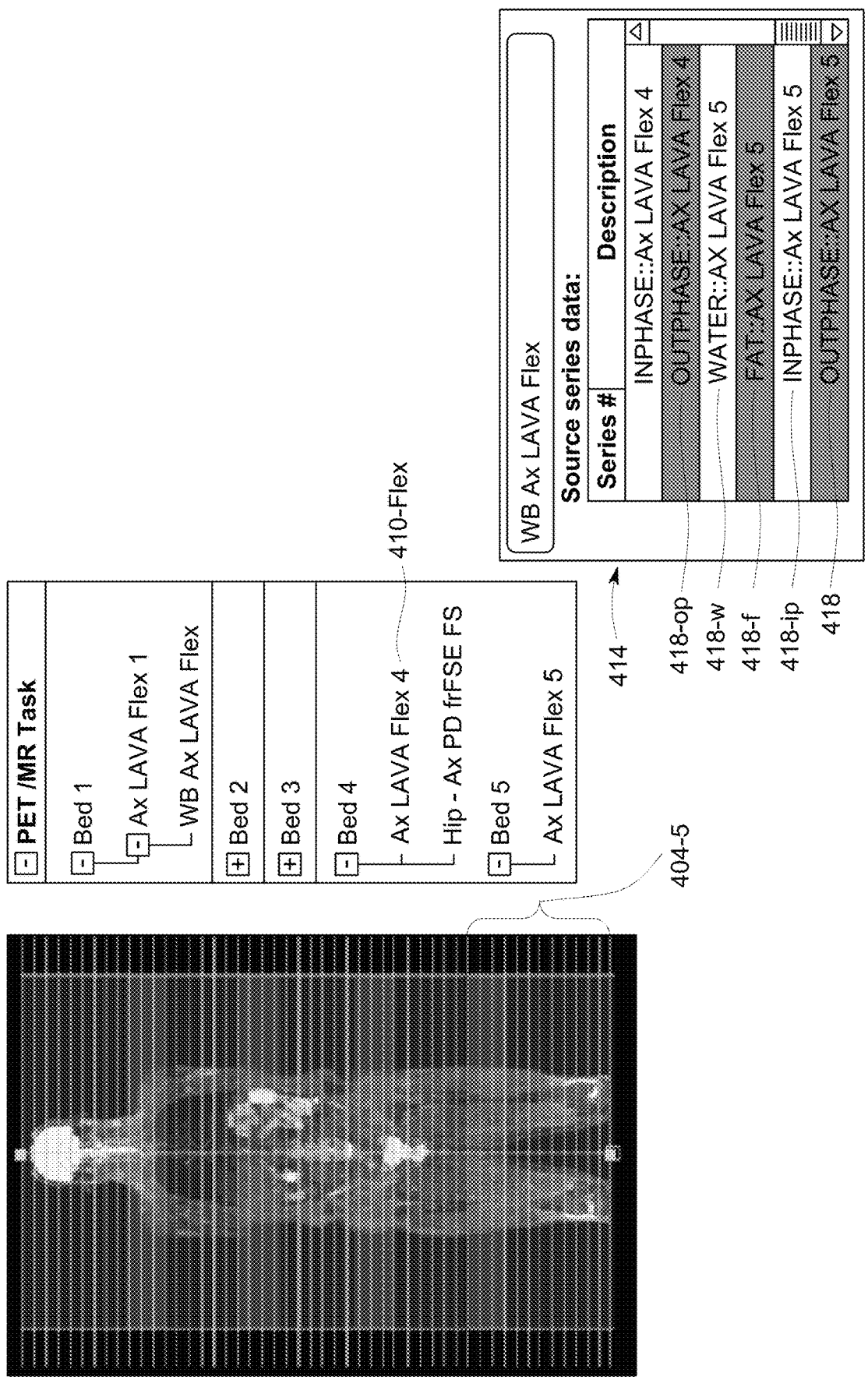
FIG. 4B shows the protocol after adding a bed and including an example MR scanning task.
Figure 4C:
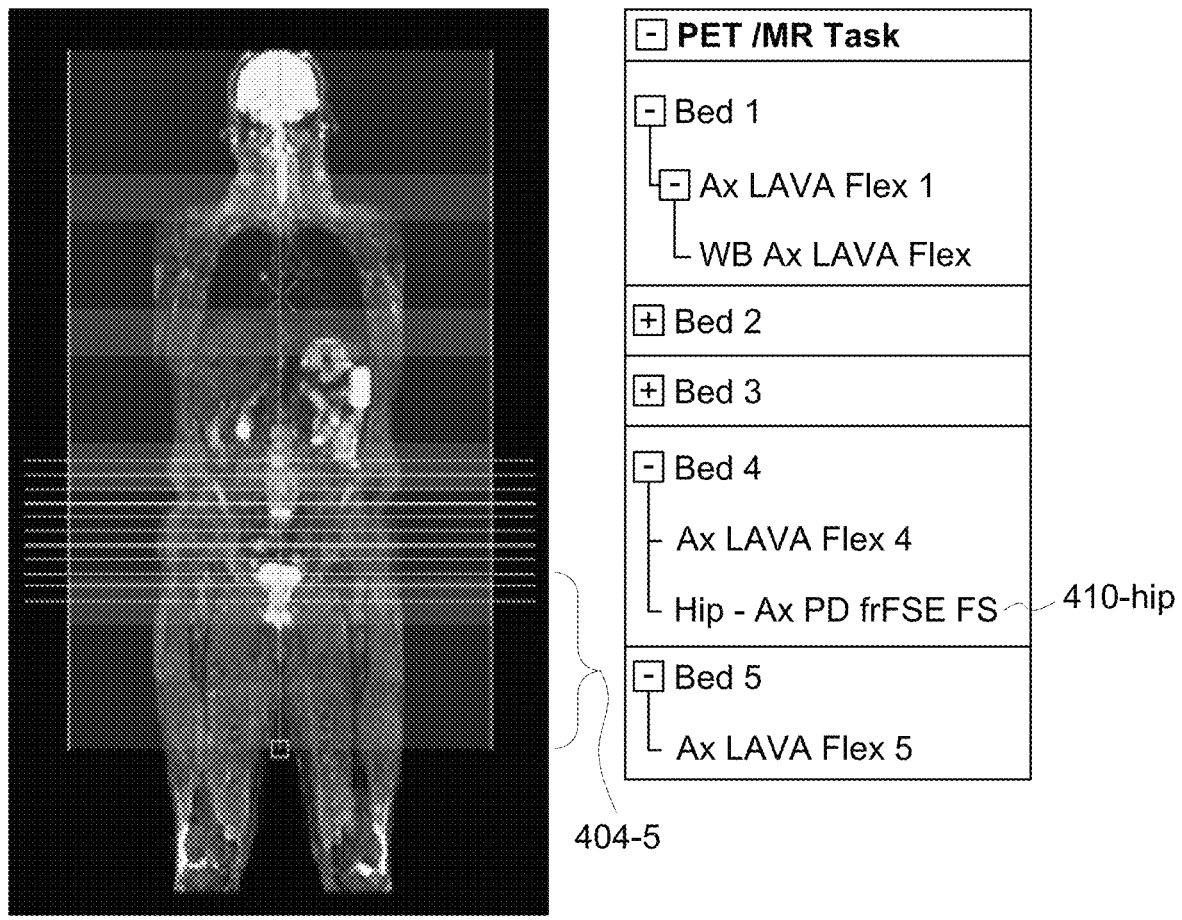
FIG. 4C shows the protocol after including another example MR scanning task.

FIGS. 4A-4C show an example process of adding 300 a bed. FIG. 4A shows protocol 402 before adding a bed 404-5. FIG. 4B shows protocol 402 after adding a bed 404-5 with an MR scanning task 410-flex having been processed. FIG. 4C shows protocol 402 with an MR scanning task 410-hip having been processed. In the example embodiment, received protocol 402 may be designed for a subject of an average height. Protocol 402 includes four beds to cover a scanning range from the top of the head to the knee. In scanning task list 412, four beds 404 are listed. For a bed, a PET scanning task 408 (simplified as "Bed 1" to "Bed 4"), and MR scanning tasks 410 are listed. In combination list 414, MR scanning task 410-flex is indicated as in a combine process, where data acquired by MR scanning task 410-flex in bed 404-4 are combined with data acquired by MR scanning task 410-flex in bed 404-3. The subject is taller than average. Five beds are needed to cover the same range from the top of the head to the knee (see FIGS. 4B and 4C). A new bed 404-5 is added. Because MR scanning task 410-flex is indicated as to be in a combine process, MR scanning task 410-flex is duplicated in bed 404-5 (FIG. 4B). The name of MR scanning task 410 is updated to reflect the corresponding bed. The updated MR scanning task 410-flex is added to combination list 414. MR scanning task 410-flex may include a plurality of subtasks 418 having different combination indicators. In-phase subtask 418-$ip$ and water subtask 418-$w$ are indicated to be combined, while out-of-phase subtask 418-$op$ and fat subtask 418-$f$ are indicated as not to be combined (shown as shaded in FIGS. 4A, 4B, and 6A-6E). The indicators of the subtasks 418 are duplicated in new bed 404-5 such that, like for bed 404-4, in-phase subtask 418-$ip$ and water subtask 418-$w$ in new bed 404-5 are in the combine process, while out-of-phase subtask 418-$op$ and fat subtask 418-$f$ are not in the combine process. As a result, MR scanning task 410-flex is acquired at a new bed 404-5 simultaneously with PET acquisition at bed 404-5. In-phase, out-of-phase, water only, and fat only data or images are generated based on the data acquired with MR scanning task 410-flex. Based on the combination list, in-phase and water only images and/or data at bed 404-5 will be combined with in-phase and water only images and/or data at other bed(s) in post-processing, while out-of-phase and fat only images and/or data at bed 404-5 will not be combined with out-of-phase and fat only images and/or data at other bed(s) in post-processing. Accordingly, protocol 402 is automatically adjusted. Protocol 402 may be further adjusted to align with the subject's anatomies, for example by moving bed positions or bed ranges to align with specific anatomies. The systems and methods described herein automize over 20 manual processes in a known system, reducing errors and saving time and labor.

In the example embodiment, unlike MR scanning task 410-flex, MR scanning task 410-hip is not included in combination list 414 (see FIG. 4A). As such, MR scanning task 410-flex is not copied in new bed 404-5 (see FIG. 4C).

Figure 5:
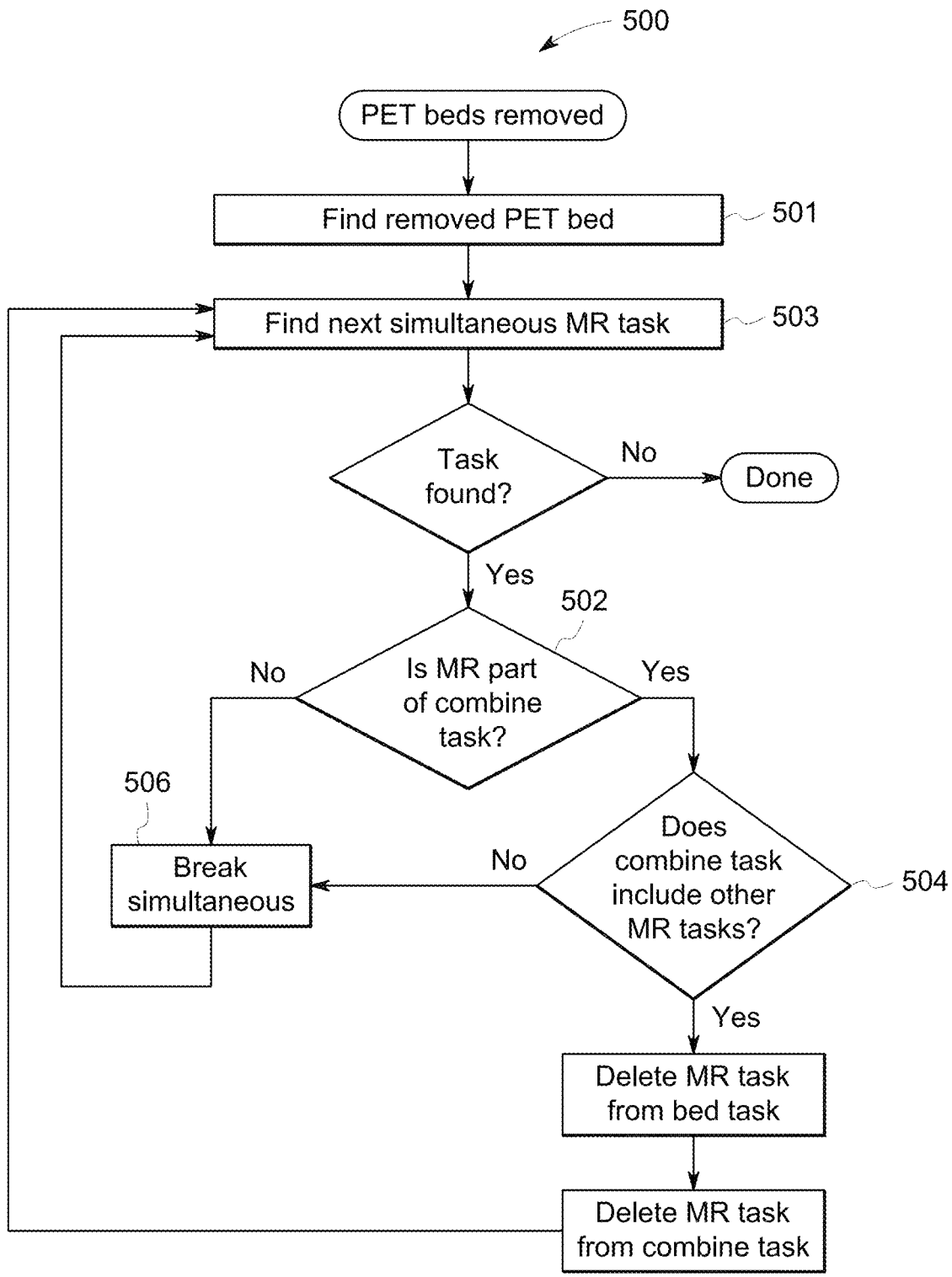
FIG. 5 is a flow chart of an example method of removing a bed in a PET-MR system.

FIG. 5 is a flow chart of an example method of deleting 500 a bed. In the example embodiment, method 500 includes identifying 501 a removed bed. The removed bed may be the most inferior bed in scanning task list 412 (see FIG. 6A described later). Method 500 further includes identifying 503 a simultaneous MR scanning task in the removed bed. If an MR scanning task is not found in the removed bed, the process of deleting 500 is completed. If an MR scanning task is found, whether the MR scanning task is in a combine process is determined 502. If the MR scanning task 410 is not in the combine process, the simultaneousness of the MR data is broken 506, where the MR scanning task will not be performed simultaneously with a PET scanning task of a bed. Protocol adjustment computing device 202 then goes back to identifying 503 a simultaneous MR scanning task. If the MR scanning task is in a combine process, whether the combine process includes the same MR scanning task from more than one bed is determined 504. If more than one bed of the MR scanning task are included in the combine process, the MR scanning task in the removed bed is deleted from scanning task list 412 and is also deleted from the combine process. If the MR scanning task of only one bed is included in the combine process, the simultaneousness of the MR scanning task is broken 506. After the MR scanning task is processed, Protocol adjustment computing device 202 goes back to identifying 503 a simultaneous MR scanning task in the removed bed. As such, protocol 402 is automatically updated by updating the scan task list, MR scanning tasks, and the combination list.

Figure 6A:
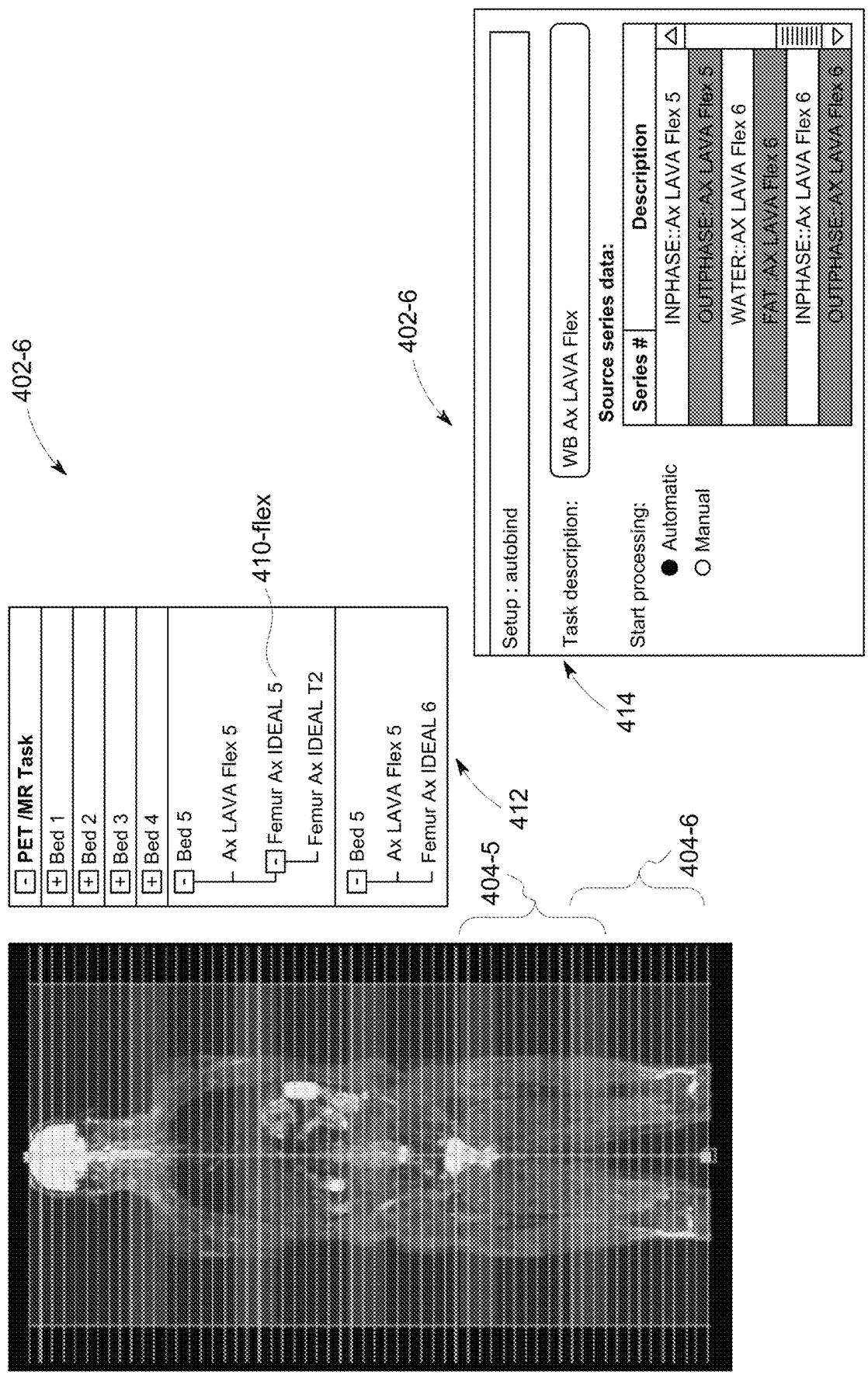
FIG. 6A shows an example protocol before removing a bed.
Figure 6B:
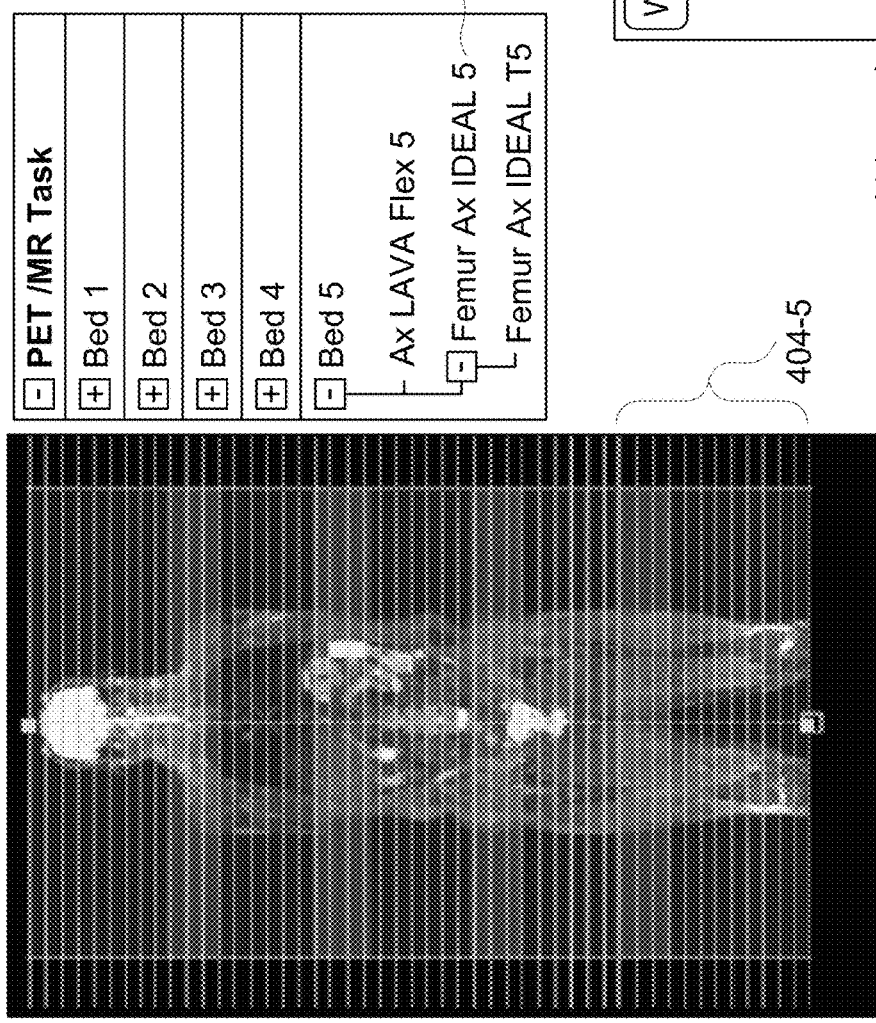
FIG. 6B shows the protocol after removing a bed with an example MR scanning task having been processed.
Figure 6C:
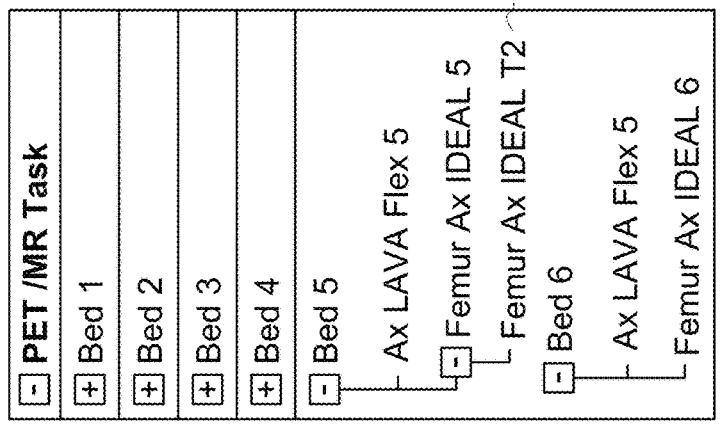
FIG. 6C shows the protocol before another example MR scanning task having been processed.
Figure 6C:
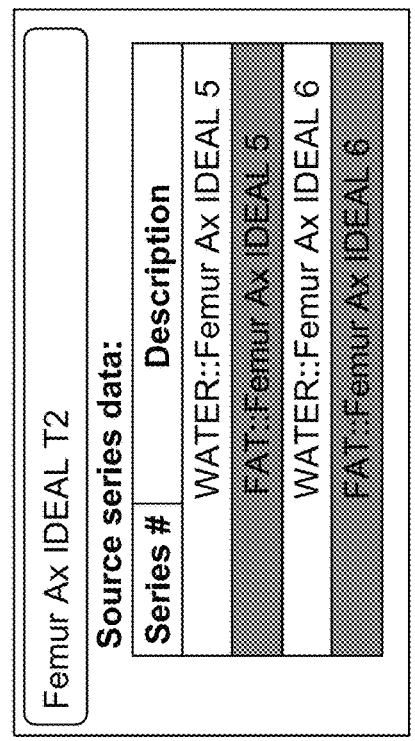
Figure 6C:
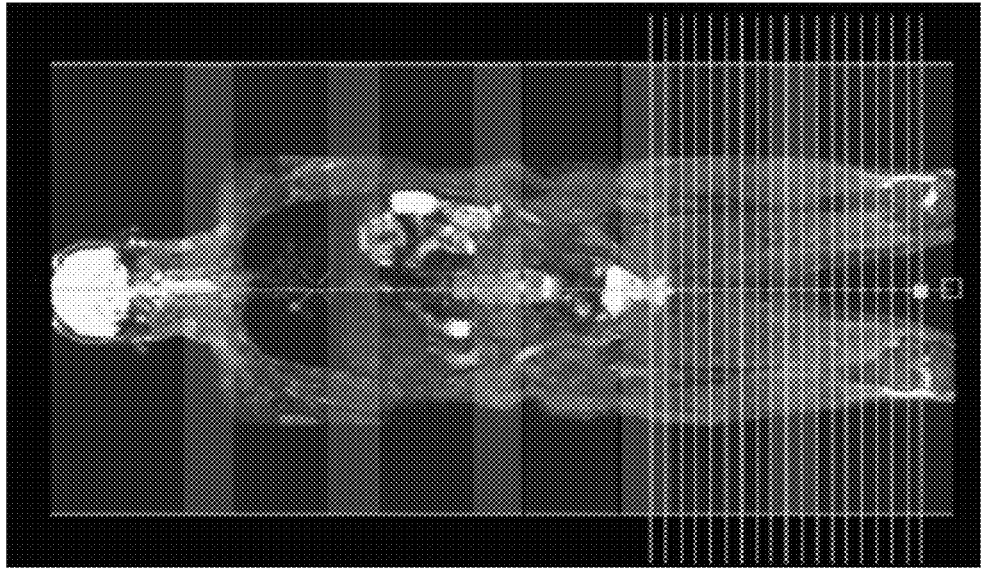
Figure 6D:
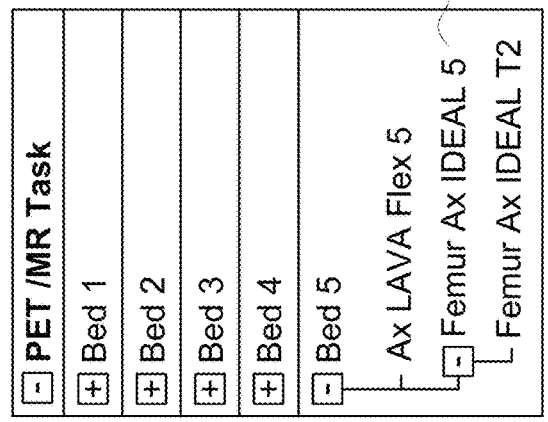
FIG. 6D shows the protocol after removing a bed.
Figure 6E:
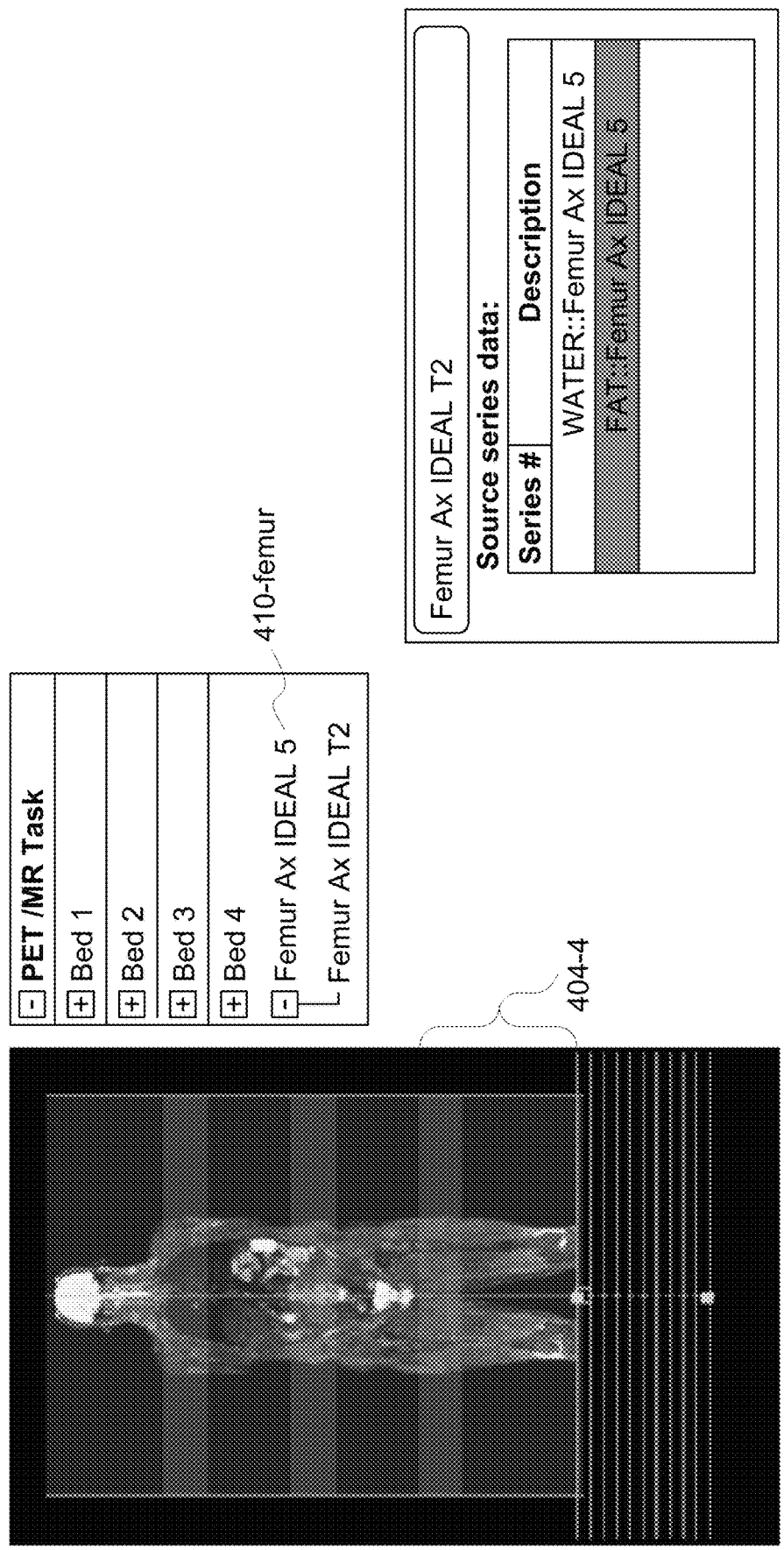
FIG. 6E shows the protocol after removing another bed.

FIGS. 6A-6E show an example deleting 500 a bed. FIG. 6A shows protocol 402-6 before the adjustment. FIG. 6B shows protocol 402 after a bed 404-6 is removed with an MR scanning task 410-flex having been processed. FIG. 6C shows protocol 402 before an MR scanning task 410-femur is processed. FIG. 6D shows protocol 402 after MR scanning task 410-femur is processed with one bed 404-6 removed. FIG. 6E shows protocol 402 after MR scanning task 410-femur is processed with two beds 404-6 and 404-5 removed. In the example embodiment, protocol 402 includes six beds for a subject of an average height to cover a range from the top of the head to the knee (FIG. 6A). The subject to be scanned is shorter than average, and only 5 beds are needed to cover the same range from the top of the head to the knee (see FIG. 6B). MR scanning task 410-flex is in a combine process, and is listed in combination list 414. As a result, MR scanning task 410-flex from bed 404-6 is deleted in the scanning task list and also deleted from the combination list (see FIG. 6B). In bed 404-6, MR scanning task 410-femur is also included. Because MR scanning task 410-femur is included in more than one beds 404-5 and 404-6 in combination list 414 (FIG. 6C), MR scanning task 410-femur in removed bed 404-6 is deleted from scanning task list 412 and combination list 414 (FIG. 6D). In some scenarios, the subject has a height that two beds need to be removed to cover the same range from the top of the head to the knee. In deleting bed 404-5, because only one MR scanning task 410-femur is included in combination list 414 after the removal of bed 404-6 (see FIG. 6D), the simultaneousness of MR scanning task 410-femur in bed 404-5 is broken (see FIG. 6E), where MR scanning task 410-femur for bed 404-5 is listed with remaining PET scanning tasks for beds 404-1 to 404-4 and is not associated with any bed 404 at the moment. The indicators of subtasks 418 are not affected in the deletion 500, where subtasks 418 associated with an MR scanning task 410 are deleted along the deletion of MR scanning task 410 or remain as they are if MR scanning task 410 is not deleted (see FIGS. 6B, 6D and 6E).

After protocol adjustment system 200 automatically adjusts protocol 402 by adding 300 or deleting 500 a bed, a user of protocol adjustment system 200 may review protocol and adjust MR scanning tasks 410 by going through scanning task list 412 relative to localizer image 416. MR scanning tasks 410 may be moved to be associated with a different bed or with a bed when the simultaneousness of the MR scanning task 410 was previously broken. The name of moved MR scanning task 410 is updated by including the new bed number in the name. Scanning task list 412 and/or combination list 414 may be updated to reflect the new bed number.

Bed(s) being added or removed from the inferior end, or the end of the beds proximate to the feet of the subject, is described as an example for illustration purposes only. Bed(s) may be added or removed from the superior end, or the end proximate to the head of the subject.

Systems and methods may be applied to a stand-alone MR system, where the system does not include components of PET subsystem 104, such as detector array 70, coincidence processor 74, sorter 76, and PET data receive port 78. In applying to an MR system, MR scanning tasks are added or deleted for multiple beds or stations. Beds 404 may be referred to as stations in the context of an MR system. Protocol 402 may be adjusted as described above, except that PET scanning tasks are not included or considered and simultaneousness with a PET scanning task is not considered.

Systems and methods described herein may be applied to other imaging modalities to automatically adjust scanning tasks in protocols, where scanning tasks in different beds may be different. Systems and methods described herein are configured to process scanning tasks based on the combination list such that the scanning tasks and protocols accommodate individual subjects, thereby imaging desired anatomies and process and displaying the data and images as desired.

Figure 7:
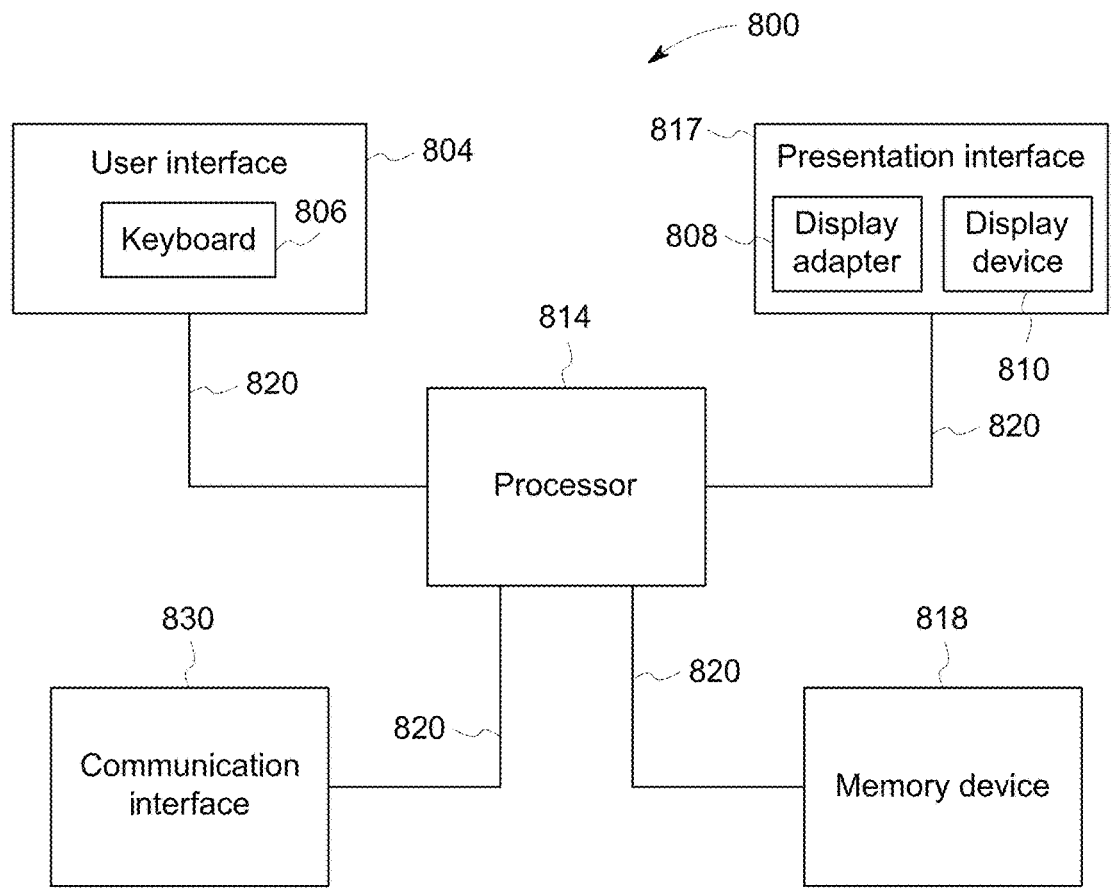
FIG. 7 is a block diagram of an example user computing device.

Computer system 20 and protocol adjustment computing device 202 described herein may be any suitable computing device 800 and software implemented therein. FIG. 7 is a block diagram of an example computing device 800. In the example embodiment, computing device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the example embodiment, computing device 800 includes a presentation interface 817 that presents information, such as input events and/or validation results, to the user. Presentation interface 817 may also include a display adapter 808 that is coupled to at least one display device 810. More specifically, in the example embodiment, display device 810 may be a visual display device, such as a cathode ray tube (CRT), a liquid crystal display (LCD), a light-emitting diode (LED) display, and/or an "electronic ink" display. Alternatively, presentation interface 817 may include an audio output device (e.g., an audio adapter and/or a speaker) and/or a printer.

Computing device 800 also includes a processor 814 and a memory device 818. Processor 814 is coupled to user interface 804, presentation interface 817, and memory device 818 via a system bus 820. In the example embodiment, processor 814 communicates with the user, such as by prompting the user via presentation interface 817 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are for illustration purposes only, and thus are not intended to limit in any way the definition and/or meaning of the term "processor."

In the example embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the example embodiment, memory device 818 stores, without limitation, application source code, application object code, configuration data, additional input events, application states, assertion statements, validation results, and/or any other type of data. Computing device 800, in the example embodiment, may also include a communication interface 830 that is coupled to processor 814 via system bus 820. Moreover, communication interface 830 is communicatively coupled to data acquisition devices.

In the example embodiment, processor 814 may be programmed by encoding an operation using one or more executable instructions and providing the executable instructions in memory device 818. In the example embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 8:
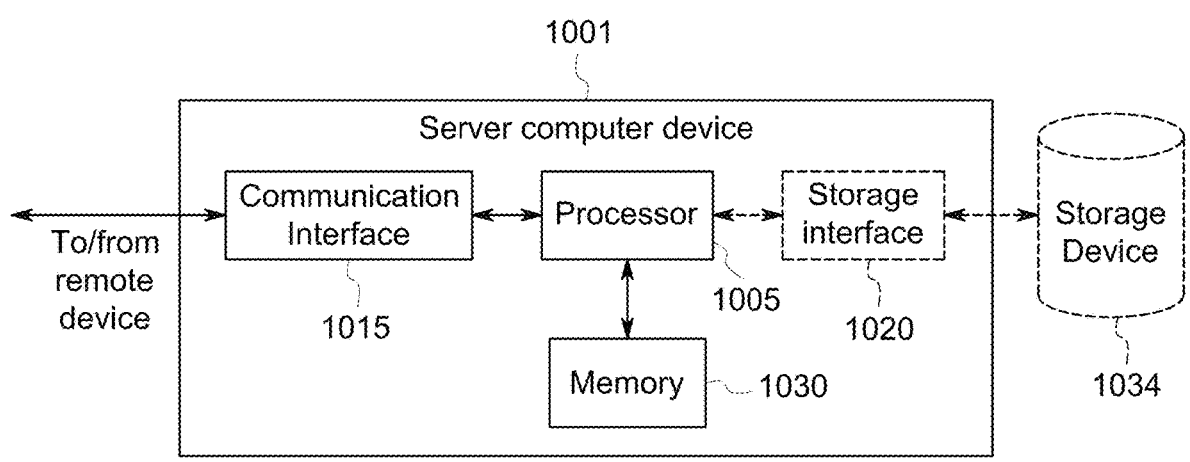
FIG. 8 is a schematic diagram of a server computing device.

FIG. 8 illustrates an example configuration of a server computer device 1001 such as protocol adjustment computing device 202. Server computer device 1001 also includes a processor 1005 for executing instructions. Instructions may be stored in a memory area 1030, for example. Processor 1005 may include one or more processing units (e.g., in a multi-core configuration).

Processor 1005 is operatively coupled to a communication interface 1015 such that server computer device 1001 is capable of communicating with a remote device or another server computer device 1001. For example, communication interface 1015 may receive data from computer system 20, via the Internet.

Processor 1005 may also be operatively coupled to a storage device 1034. Storage device 1034 is any computer-operated hardware suitable for storing and/or retrieving data, such as, but not limited to, wavelength changes, temperatures, and strain. In some embodiments, storage device 1034 is integrated in server computer device 1001. For example, server computer device 1001 may include one or more hard disk drives as storage device 1034. In other embodiments, storage device 1034 is external to server computer device 1001 and may be accessed by a plurality of server computer devices 1001. For example, storage device 1034 may include multiple storage units such as hard disks and/or solid state disks in a redundant array of inexpensive disks (RAID) configuration. storage device 1034 may include a storage area network (SAN) and/or a network attached storage (NAS) system.

In some embodiments, processor 1005 is operatively coupled to storage device 1034 via a storage interface 1020. Storage interface 1020 is any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

At least one technical effect of the systems and methods described herein includes (a) automatically adjusting MR scanning tasks in protocols of a PET-MR system; (b) automatically adjusting MR scanning tasks in protocols of an MR system in multi-station MR applications.

Example embodiments of systems and methods of protocol adjustment are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A positron emission tomography-magnetic resonance (PET-MR) system, comprising:
    an MR subsystem configured to acquire MR signals from a subject;
    a PET subsystem configured to acquire PET emissions of the subject, the PET subsystem integrated with the MR subsystem; and
    a protocol adjustment system in communication with the MR subsystem and the PET subsystem, comprising a protocol adjustment computing device, the protocol adjustment computing device comprising at least one processor electrically coupled with at least one memory device, and the at least one processor programmed to:
        receive one or more localizer images;
        receive a protocol, wherein the protocol includes:

a scanning task list associated with one or more beds and including:
a PET scanning task of a bed of the one or more beds; and
one or more MR scanning tasks of the bed and to be performed simultaneously with the PET scanning task, a range of an individual bed in the one or more beds limited by a scanning range of the PET subsystem, and
a combination list indicating MR data acquired by an MR scanning task of one bed of the one or more beds are to be combined with MR data acquired by a same MR scanning task of another bed, wherein the another bed is one of the one or more beds or a new bed;
adjust the protocol, based on the combination list and the one or more localizer images, by:
processing the one or more MR scanning tasks based on the combination list; and
output the adjusted protocol to the PET-MR system.

2. The PET-MR system of claim 1, wherein the at least one processor is further programmed to:
add to the scanning task list the new bed to be inferior to a previously most inferior bed in the scanning task list; and
wherein according to the combination list, data of an MR scanning task of the previously most inferior bed are not indicated as to be combined, the at least one processor further programmed to:
not copy the MR scanning task of the previously most inferior bed to the new bed.

3. The PET-MR system of claim 1, wherein the at least one processor is further programmed to:
remove from the scanning task list a most inferior bed in the scanning task list; and
wherein according to the combination list, data of an MR scanning task of the most inferior bed are not indicated as to be combined, the at least one processor further programmed to:
break simultaneousness of the MR scanning task of the most inferior bed.

4. The PET-MR system of claim 1, wherein the at least one processor is further programmed to:
determine whether to change a number of beds based on a height of a subject by comparing a desired range of anatomies based on the one or more localizer images and a range in the protocol.

5. The PET-MR system of claim 1, wherein the at least one processor is further programmed to:
add to the scanning task list the new bed to be inferior to a previously most inferior bed in the scanning task list; and
wherein according to the combination list, data of an MR scanning task of the previously most inferior bed are indicated as to be combined, the at least one processor further programmed to:
copy the MR scanning task of the previously most inferior bed to the new bed.

6. The PET-MR system of claim 5, wherein the at least one processor is further programmed to update the combination list by indicating the MR scanning task of the new bed as to be combined.

7. The PET-MR system of claim 1, wherein the at least one processor is further programmed to:
remove from the scanning task list a most inferior bed in the scanning task list; and
wherein according to the combination list, data of an MR scanning task of the most inferior bed are indicated as to be combined, the at least one processor further programmed to:
determine whether the MR scanning task of the most inferior bed is also associated with the another bed.

8. The PET-MR system of claim 7, wherein the MR scanning task of the most inferior bed is also associated with the another bed, the at least one processor programmed to:
delete the MR scanning task of the most inferior bed from the scanning task list; and
delete the MR scanning task of the most inferior bed from the combination list.

9. The PET-MR system of claim 7, wherein the MR scanning task of the most inferior bed is not also associated with the another bed, the at least one processor programmed to:
break simultaneousness of the MR scanning task of the most inferior bed.

10. A protocol adjustment system, comprising a protocol adjustment computing device, the protocol adjustment computing device comprising at least one processor electrically coupled with at least one memory device, and the at least one processor programmed to:
receive one or more localizer images;
receive a protocol, wherein the protocol includes:
a scanning task list associated with one or more beds and including:
a PET scanning task of a bed of the one or more beds; and
one or more MR scanning tasks of the bed to be performed simultaneously with the PET scanning task, a range of an individual bed in the one or more beds limited by a scanning range of a PET subsystem, and
a combination list indicating MR data acquired by an MR scanning task of one bed of the one or more beds are to be combined with MR data acquired by a same MR scanning task of another bed, wherein the another bed is one of the one or more beds or a new bed;
adjust the protocol, based on the combination list and the one or more localizer images, by:
processing the one or more MR scanning tasks based on the combination list; and
output the adjusted protocol to a PET-MR system.

11. The protocol adjustment system of claim 10, wherein the at least one processor is further programmed to:
add to the scanning task list the new bed to be inferior to a previously most inferior bed in the scanning task list; and
wherein according to the combination list, data of an MR scanning task of the previously most inferior bed are not indicated as to be combined, the at least one processor further programmed to:
not copy the MR scanning task of the previously most inferior bed to the new bed.

12. The protocol adjustment system of claim 10, wherein the at least one processor is further programmed to:
remove from the scanning task list a most inferior bed in the scanning task list; and
wherein according to the combination list, data of an MR scanning task of the most inferior bed are not indicated as to be combined, the at least one processor further programmed to:
break simultaneousness of the MR scanning task of the most inferior bed.

13. The protocol adjustment system of claim 10, wherein the at least one processor is further programmed to:
   determine whether to change a number of beds based on a height of a subject by comparing a desired range of anatomies based on the one or more localizer images and a range in the protocol.

14. The protocol adjustment system of claim 10, wherein the at least one processor is further programmed to:
   add to the scanning task list the new bed to be inferior to a previously most inferior bed in the scanning task list; and
   wherein according to the combination list, data of an MR scanning task of the previously most inferior bed are indicated as to be combined, the at least one processor further programmed to:
      copy the MR scanning task of the previously most inferior bed to the new bed.

15. The protocol adjustment system of claim 14, wherein the at least one processor is further programmed to update the combination list by indicating the MR scanning task of the new bed as to be combined.

16. The protocol adjustment system of claim 10, wherein the at least one processor is further programmed to:
   remove from the scanning task list a most inferior bed in the scanning task list; and
   wherein according to the combination list, data of an MR scanning task of the most inferior bed are indicated as to be combined, the at least one processor further programmed to:
      determine whether the MR scanning task of the most inferior bed is also associated with the another bed.

17. The protocol adjustment system of claim 16, wherein the MR scanning task of the most inferior bed is also associated with the another bed, the at least one processor is programmed to:
   delete from the scanning task list the MR scanning task of the most inferior bed; and
   delete the MR scanning task of the most inferior bed from the combination list.

18. The protocol adjustment system of claim 16, wherein the MR scanning task of the most inferior bed is not also associated with the another bed, the at least one processor programmed to:
   break simultaneousness of the MR scanning task of the most inferior bed.

19. A protocol adjustment system of a magnetic resonance (MR) system, comprising a protocol adjustment computing device, the protocol adjustment computing device comprising at least one processor electrically coupled with at least one memory device, and the at least one processor programmed to:
   receive one or more localizer images;
   receive a protocol, wherein the protocol includes:
      a scanning task list associated with one or more beds and including one or more MR scanning tasks of a bed of the one or more beds; and
      a combination list indicating MR data acquired by an MR scanning task of one bed of the one or more beds are to be combined with MR data acquired by a same MR scanning task of another bed, wherein the another bed is one of the one or more beds or a new bed;
   adjust the received protocol, based on the combination list and the one or more localizer images, by:
      processing the one or more MR scanning tasks based on the combination list; and
   output the adjusted protocol to the MR system.

20. The protocol adjustment system of claim 19, wherein the at least one processor is further programmed to:
   determine whether to change a number of beds based on a height of a subject by comparing a desired range of anatomies based on the one or more localizer images and a range in the protocol.

* * * * *